Patented May 13, 1952

2,596,674

UNITED STATES PATENT OFFICE 2,596,674

AMINE SALICYLATE OINTMENT

Olivier Gaudin, Neuilly-sur-Seine, France

No Drawing. Application November 30, 1949, Serial No. 130,361. In France December 6, 1948

2 Claims. (Cl. 167—63)

This application is a continuation-in-part of copending application Serial No. 793,513 filed December 23, 1947, now abandoned.

The present invention relates to a novel group of organic amino salts of salicylic acid having increased cutaneous and tissue penetrative power, and to methods of controlling the action of salicylic acid on living tissue.

It is known that certain acidic anions increase the penetrative power of alkaloids and anesthetics. It has also been found that a notable difference exists in this respect between inorganic and organic acids. I have now made the entirely unexpected discovery that the cations, too, play an important role in the activity of certain salts in respect to their penetrative power into tissues and cells. In accordance with this discovery, I have found that certain salts of salicylic acid possess very different properties, depending on the cations used, and that these cations apparently serve as active vehicles across living tissues (human, animal and plants). In particular, I have found that certain organic amino salts of salicylic acid, and especially diethylamine salicylate, have a penetrative power far superior to any of the salicylates previously known or used for various medical or cosmetic purposes.

Various derivatives containing salicylic acid have previously been used as remedies against rheumatic and/or arthritic pains, either orally or externally. Among these, sodium salicylate has been found to have too low a level of tolerance in many patients, particularly causing stomach and liver disturbances. Another one, methyl salicylate has not only a very unpleasant odor but also results in irritation of the skin. The physiological activity of both, and other known similar compounds, is comparatively weak and the results are, therefore, unsatisfactory.

It is a principal object of the present invention to provide organic salicylic compounds having increased cutaneous and tissue penetrative power.

It is a further object of the invention to provide organic salicylic compounds having a high skin tolerance.

It is also an object of this invention to provide organic amino salicylates of increased therapeutic value, being practically non-toxic, odorless and pleasant to use.

It is a more specific object of the present invention to provide the diethylamine salicylate as a very good agent for obtaining the above mentioned effects.

The above and other features and objects of my invention will become more clear in the following description which, however, is merely illustrative and in no way limits the scope and spirit of the invention.

I have discovered that certain amino salts of salicylic acid and their derivatives, especially those containing aliphatic amines soluble in water, are physiologically very active and have a penetrative power of the skin of from 300 to 800% above that of a salicylate with a mineral base (sodium) or methyl salicylate. In addition, certain of these organic amino salicylates also have proved to be well tolerated by living tissues.

The amino salicylates of the present invention show ready absorption by the skin, and considerable analgesic and curative effects have been obtained therewith without disturbance to the patient's body functions. These compounds may be produced by reacting 1 mol of salicylic acid with 1 mol of the respective amine. The acid may be directly neutralized by the amine in an aqueous solution. Another process of manufacture may comprise reacting the sodium salt of the acid with the chloride of the amine. A third process of manufacture may comprise reacting the acid with the amine in a solvent which does not dissolve the resultant amino salt, i. e. chloroform in the case of diethylamine salicylate.

By way of example, I have prepared diethylamine salicylate by heating 1,300 grams of salicylic acid with 1,000 grams of diethylamine dissolved in 2,000 grams of water in a closed receptacle. The mixture was agitated and the temperature brought to 80° C. for about 20 minutes. The reaction product was then concentrated by heating in free air and consequently left to crystallize. The crystals were purified by recrystallization in water, alcohol or any suitable solvent. The resultant compound, diethylamine salicylate, has the form of white crystals and has a melting point of 100–101° C. The crystals contain one molecule of water, and may be represented by the following formula:

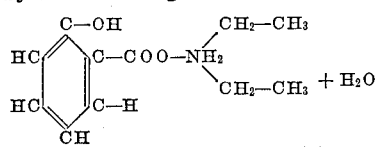

Diethylamine salicylate has absolutely no odor. At first, it tastes slightly bitter and then sweet. It is highly soluble in water (3 parts in 1 part of water) but less soluble in lipides (1 part in 100 parts of lipides).

Diethylamine salicylate may be used as active ingredient in balms and ointments; an average proportion of 10% of this active ingredient has proved highly effective but this may, of course, vary within wide limits. The composition of the balm may also vary widely, as will be readily understood by those skilled in the art. I have found it useful to include a large proportion of water in the mixture because water is a good solvent of this compound and facilitates its penetration into the skin. By way of example, an emulsion may be prepared containing approximately 10% diethylamine salicylate, 50% water, 20% glycol stearate and 20% paraffin oil. Although such a balm has given satisfactory results, wide variations of the various ingredients and their proportions are possible.

I have ascertained the important role of cations in the activity of certain salicylates in respect to their penetrative power by comparing the action of methyl salicylate, which is not ionisable, sodium salicylate, which is an ionisable compound with a mineral cation, and various amino salicylates having organic ionisable cations. In a series of experiments with rabbits and clinical tests, I have found that the cutaneous and tissue penetration varies widely according to the type of cation utilized.

In one set of experiments, a number of rabbits were prepared by shaving a patch of skin about 15 x 15 cm. in extent. The bare skin of one group of these rabbits was rubbed with a preparation containing as active ingredient sodium salicylate until complete penetration thereof into the skin. A second group was similarly treated with methyl salicylate, and following groups were treated with different amino salicylates. The active ingredients were contained, in equimolecular concentration, in a standard preparation having a base of glycol stearate, paraffin oil and water. The quantity of salicylic acid was exactly the same for each animal. The animals were all protected against licking with a cover over the treated skin. The cutaneous and tissue penetration was shown in the urine samples taken over a 48-hour period. The quantity of salicylic acid was measured by means of colorimetry and the results are shown in the following table:

Percentage of salicylic acid eliminated in the urine:

| | |
|---|---|
| I. Ionisable mineral cation: sodium salicylate | 9.46 |
| II. Non-ionisable organic salts: methyl salicylate | 13.08 |
| III. Ionisable organic cations: | |
| diethylamine salicylate | 41.18 |
| monoethylamine salicylate | 34.60 |
| monomethylamine salicylate | 10.7 |
| dimethylamine salicylate | 27.5 |
| propylamine salicylate | 20.3 |
| monoethanolamine salicylate | 23.5 |
| diethanolamine salicylate | 19 |
| triethanolamine salicylate | 15.6 |

From the above table it is obvious that certain ionisable organic cations among the amines facilitate the skin and tissue penetration of salicylates in an entirely unexpected manner. The above table shows, in particular, that the salicylic ion administered in the form of diethylamine salicylate possesses a penetrative power of from 300 to 400% of that of the corresponding sodium salt or methyl ester. It is also considerably more effective than any of the other amino salts tested.

Further it will be seen from the above table that mono or di or triethanolamine which as alkalin base have a very marked affinity for water are less suitable than bases such as diethylamine which possesses relatively less affinity for water. The water affinity may be qualitatively measured by the amine vapour tension of the aqueous solution. It will therefore be seen that the amine base combined with salicylic acid may be chosen depending upon the water affinity of the said base account being taken of the fact that bases having too great an affinity for water are less suitable for the purpose of the present invention than those having less affinity as is the case for diethanolamine salicylate.

I have made similar experiments with five patients (women of from 23 to 54 years of age) having neither renal nor skin lesions. The results were in complete accord with the above recited results in animal experimentation. The average of salicylic acid recovered from the patients' urines taken over a 48-hour period was, in the course of five experiments, as follows:

Salicylic acid: Milligrams
| | |
|---|---|
| of sodium salicylate | 21 |
| of methyl salicylate | 45.7 |
| of diethylamine salicylate | 126 |

It may be noted that the triethylamine and trimethylamine salicylates have a very low solubility in water and are, therefore, ill adapted for the above experiments.

In order to establish the generalized nature of the above phenomena in all living tissues, I have also studied the cellular penetration of the following salicylic derivatives on cells of algae Characeae, following the technique of R. Collander and E. Virtanen (Protoplasma 1938, vol. XXXI, page 499). The results were as follows, taking as unit of reference the cellular permeability of sodium salicylate:

| | Coefficient of cellular penetration |
|---|---|
| Sodium salicylate | 1 |
| Monomethylamine salicylate | 4 |
| Dimethylamine salicylate | 6 |
| Monoethylamine salicylate | 7 |
| Diethylamine salicylate | 8 |
| Propylamine salicylate | 8 |
| Monoethanolamine salicylate | 1.25 |
| Diethanolamine salicylate | 0.5 |
| Triethanolamine salicylate | 1.75 |

The above table shows that the penetrative power of diethylamine salicylate is, for instance, 800% stronger than that of sodium salicylate, twice as strong as that of monomethylamine salicylate and about 500% stronger than that of ethanolamine salicylates.

From the cited experiments on animals, humans and plants it will be clear that the cations play an important role in the permeability of the cellular membrane by salicylic derivatives. Since the same phenomena occur in all kinds of living tissues, it may be assumed that this is a basic discovery having general application but I do not wish to be limited to any scientific theory. The above experiments also show that of all the favorable organic amino salts of salicyclic acid tested, diethylamine salicylate has the greatest penetration coefficient, being 800% more powerful than sodium salicylate in the algae and 450% more powerful in humans and animals.

The discovery of the unexpectedly high penetrative power of certain organic amino salts of salicylic acid compared to that of other salicylates has proved of considerable therapeutic value, as will become clear from the following experiments on animals and by clinical tests which I have undertaken. The experiments were performed with the preferred compound, i. e. diethylamine salicylate.

The toxicity of diethylamine salicylate has been established in comparison to sodium salicylate, by injecting the two substances in mice. The results were as follows:

|  | Gram per kilogram |
|---|---|
| Lethal dose of diethylamine salicylate for 50% of the subject treated | 1.5 |
| Lethal dose of sodium salicylate (50%) | 1 |

Diethylamine salicylate is, therefore, less toxic than the sodium derivative and can be considered practically non-toxic.

The skin tolerance to diethylamine compared to that of methyl salicylate was studied on rabbits. Ten rabbits were prepared with a bare path of skin, as in my previously mentioned experiments, and five of them were rubbed daily with 2 grams of balm containing 15% methyl salicylate measured in salicylic acid, and the five others were similarly treated with 2 grams of balm containing 15% diethylamine salicylate measured in salicylic acid.

In the first group of rabbits, the first application showed irritation of the skin, the second application caused skin lesions of an escharotic type; and it was not possible to effect a third application due to the bad state of the skin. The skin was restored to something like normal only after about two weeks and the hair growing in the place treated was of different colour, which shows the severity of the lesions.

In contrast to the above, the five rabbits receiving diethylamine salicylate ointments, under identical conditions, did not show any signs of skin irritation and the applications were renewed daily for five days without showing the slightest skin intolerance to the applications.

Another feature of great therapeutic value is the easy dissociation of diethylamine salicylate which is very rapid. After penetrating through the skin, it is dissociated in the blood and the salicylic acid thus liberated can exert its analgesic and curative properties "loco dolenti."

I have investigated many clinical cases and treated the same with a balm containing 10% diethylamine salicylate. Very satisfactory results were obtained particularly in the case of rheumatic and arthritic ailments. I have found that three, or more, external applications a day produce effective pain relief, sometimes as soon as half an hour after the treatment; swellings gradually decrease and the skin irritation, if any, vanishes. In many cases of small infectious arthritis, neuralgic pains, periarthritis, scapulalgy, chronic crippling rheumatism, polyarthritis, lumbago, sciatica, and similar ailments, diethylamine salicylate ointments have seen shown to give quick relief and amazing therapeutic results unobtainable with any of the previously known salicylates used.

Diethylamine salicylate may also be administered orally in the form of pills, powders and any other form, at the average dose of 0.5 gram. The pellets or pills may be coated with keratin or gluten, or other similar ingredient, to avoid early liberation of the active ingredient in the stomach.

While I have described my invention with reference to specific compounds and examples, it is to be clearly understood that this description is made only by way of illustration and that the preparation as well as the manner of utilization of other compounds having the properties described, which will be obvious to those skilled in the art, are to be considered within the scope of the present invention. I intend to be limited, therefore, only by the following claims.

What is claimed is:

1. An analgesic balm for external application comprising a fatty base, water and a compound selected from the group consisting of dimethylamine salicylate, monoethylamine salicylate and diethylamine salicylate.

2. An analgesic emulsion of high penetrative power for external application to the skin comprising about 40% of a fatty base, about 50% water, and the balance diethylamine salicylate.

OLIVIER GAUDIN.

REFERENCES CITED

The following references are of record in the file of this patent:

UNITED STATES PATENTS

| Number | Name | Date |
|---|---|---|
| 2,113,374 | Hall | Apr. 5, 1938 |
| 2,233,419 | Moore | Mar. 4, 1941 |
| 2,382,546 | Curtis | Aug. 14, 1945 |
| 2,410,469 | Van Zoeren | Nov. 5, 1946 |

FOREIGN PATENTS

| Number | Country | Date |
|---|---|---|
| 582,148 | Germany | Aug. 9, 1933 |

OTHER REFERENCES

Zernik, Manufacturing Chemist, December, 1935, page 401. (Copy in Division 43.)

Harrass, Archives, Internationals de Pharmacodynamines, Volume 11 (1903), page 443.

Kionka Klinsche Wochenschrift, August 22, 1931, 167/650, pages 1570 to 1574.